3,745,148
STABILIZED ORGANIC COMPOSITIONS
Kju Hi Shin, Livonia, and Edward F. Zaweski, Pleasant Ridge, Mich., assignors to Ethyl Corporation, Richmond, Va.
No Drawing. Filed Apr. 5, 1971, Ser. No. 131,512
Int. Cl. C08f 45/58; C08g 51/58
U.S. Cl. 260—45.95 C        7 Claims

ABSTRACT OF THE DISCLOSURE

Organic material such as styrene-butadiene rubber is stabilized against oxidative degradation by the addition of an antioxidant composition made by the process comprising (A) reacting from 1-10 moles of a monohydric alkanol containing from 1 to about 50 carbon atoms with a mole of $P_2S_5$ at a temperature of from about 75 to about 125° C. to form a dithiophosphate reaction mixture; (B) neutralizing said dithiophosphate reaction mixture with aqueous ammonia; and (C) adding from about 1 to 3 moles of a hydroxybenzyl chloride to the neutralized reaction mixture and reacting at a temperature of from about 50 to 150° C. The preferred hydroxybenzyl chloride is 3,5-di-tert-butyl-4-hydroxybenzyl chloride, and the preferred alkanol is a mixture of monohydric aliphatic $C_{20-50}$ alcohols.

BACKGROUND

In the past, O,O-dialkyl-(3,5-dialkyl-4-hydroxybenzyl) dithiophosphates have been used mainly as antiozonants in rubber (Thompson, U.S. 3,061,586). These compounds were made by the reaction of a quinone methide with a dialkyl dithiophosphoric acid. Mikeska et al., in U.S. 2,530,339, disclosed the use of compounds such as tert-octyl hydroxybenzyl dioctyl dithiophosphate in lubricating oil. Mikeska et al's. compounds were made by methods such as reacting the sodium salt of dioctyl dithiophosphoric acid with tert-octyl hydroxybenzyl chloride.

SUMMARY

It has now been found that an antioxidant composition containing an O,O-dialkyl hydroxybenzyl dithiophosphate can be prepared by reacting an alcohol with $P_2S_5$, neutralizing the reaction mixture with aqueous ammonia and reacting the mixture with a hydroxybenzyl chloride. These antioxidant compositions are non-discoloring when compared to similar antioxidants disclosed in the prior art. They are especially useful in synthetic rubber such as styrene-butadiene rubber. Thus, an object of the invention is to provide a process for making an antioxidant composition which effectively stabilizes a broad range of organic materials against oxidative degradation. A further object is to provide stabilized organic compositions containing the antioxidant composition made by the described process.

DESCRIPTION OF THE PREFERRED EMBODIMENTS

An embodiment of this invention is a process comprising:
(A) reacting from 1-10 moles of a monohydric alkanol containing from 1 to about 50 carbon atoms with a mole of $P_2S_5$ at a temperature of from about 75 to about 125° C. to form a dithiophosphate reaction mixture;
(B) neutralizing said dithiophosphate reaction mixture with aqueous ammonia; and
(C) adding from about 1 to 3 moles of a hydroxybenzyl chloride to the neutralized reaction mixture and reacting at a temperature of from about 50 to 150° C.

The alkanols containing from 1 to about 50 carbon atoms useful in the present process are the aliphatic monohydric alcohols such as methanol, ethanol, propanol, isopropanol, butanol, isobutanol, hexanol, octanols, decanols, dodecanols, octadecanols, eicosanols, docosanols, tetracosanols, hexacosanols, octacosanols, triacontanols, tetracontanols, pentacontanols, and the like.

A particularly preferred alkanol reactant is a mixture of aliphatic monohydric alcohols containing from about 20–50 carbon atoms. Minor amounts of lower alcohols (e.g., $C_{18}$ alcohols) can be present. The major amount of alcohols are primary. The preferred proportion of alcohols in the mixture of alcohols containing from about 20–50 carbon atoms is as follows:

| Alcohol: | Percent |
|---|---|
| $C_{20}$ | 14–29 |
| $C_{22}$ | 14–29 |
| $C_{24}$ | 7–21 |
| $C_{26}$ | 7–21 |
| $C_{28}$ | 7–21 |
| $C_{30-50}$ | 7–21 |

The above percent composition is based upon the alcohol content and does not take into account any diluent or other material which might be present. As stated previously, small amounts, up to about 3 percent, of $C_{18}$ alcohols can also be present in the preferred alcohol mixtures.

The above alcohol mixtures are readily available from an aluminum alkyl chain growth alcohol process such as is shown in U.S. 3,384,651; U.S. 3,415,861 and U.S. 3,475,501, the disclosure of which is incorporated hereby by reference. In these processes an aluminum alkyl such as triethyl aluminum is reacted with ethylene under pressure and elevated temperature until the alkyl radicals bonded to aluminum grow to give a distribution of alkyl radicals, some of which contain up to about 50 carbon atoms. These high molecular weight aluminum alkyl mixtures are then oxidized under controlled conditions using a dilute oxygen stream until they are converted to aluminum alkoxides. These in turn are hydrolyzed to form an alcohol mixture. The lower alcohols containing up to about 18 carbon atoms can be readily removed by distillation, leaving as the distillation bottoms an alcohol mixture in which the alcohols contain from about 20–50 carbon atoms and in which a majority of the alcohols are primary. Such distillation bottoms from an aluminum alkyl chain growth alcohol process are exceptionally good starting materials for forming the additives of this invention.

The high molecular weight alcohol mixture produced by the above aluminum alkyl chain growth process also contains a substantial amount of aliphatic hydrocarbons. These aliphatic hydrocarbons are mixtures of saturated and unsaturated hydrocarbons and are present in an amount of from about 20–50 weight percent. In a highly preferred embodiment of this invention the alcohol used to prepare the dithiophosphate reaction mixture in the first stage is the distillation bottoms after removing alcohols containing up to about 18 carbon atoms from an aluminum alkyl chain growth alcohol process and contains a solution of about $C_{20-50}$ alkanols, of which a majority are primary, in a mixture of saturated and unsaturated aliphatic hydrocarbons containing from about 20–50 carbon atoms, such that the resulting solution has an iodine number of from about 5–20. As stated above, these alcohol solutions are readily available from the well-known aluminum alkyl chain growth process by merely conducting the chain growth step until the alkyl groups contain up to about 50 carbon atoms, oxidizing the mixture to aluminum alkoxides, hydrolyzing this to form an alcohol mixture, and distilling out the lower alcohols containing up to about 18 carbon atoms to leave a composition consisting essentially of a solution of alcohols containing about 20–50 carbon atoms (principally $C_{20-30}$ alcohols) in a mixture of saturated and unsaturated aliphatic hydrocarbons containing 20–50 carbon atoms. The hydrocarbon mixture represents about 20–50 percent of the solution and is such that the iodine number of the total mixture is from about 5–20.

It is believed that the olefin content of the hydrocarbon diluent takes part in the formation of some compounds in the complex reaction product produced by the process defined herein. The exact nature of this participation is not known.

The first stage in the process involves the reaction of from about 1–10 moles of the above alkanols with a mole of $P_2S_5$. This reaction is carried out by mixing the alkanol and $P_2S_5$ while stirring at reaction temperature. Although reaction temperatures of from about 50–200° C. can be used, a preferred range is from about 75–150° C., and the best results as far as final stabilizer properties are concerned are obtained when a reaction temperature of about 75–125° C. is used in the preparation of the dithiophosphate reaction mixture.

The stoichiometry of the reaction requires 4 moles of alcohol for each mole of phosphorus pentasulfide ($P_2S_5$). Generally, an excess of phosphorus pentasulfide is employed. A useful reactant ratio is from about 2–4 moles of alcohol per mole of phosphorus pentasulfide. Superior results are obtained using about 2–3.5 moles of alcohol per mole of phosphorus pentasulfide.

In one embodiment the unreacted $P_2S_5$ can be filtered off after formation of the dithiophosphate reaction mixture. However, in a more preferred embodiment the unreacted $P_2S_5$ is not filtered off but left in the reaction mixture. This excess $P_2S_5$ enters into the subsequent reaction stages and leads to an antioxidant having reduced coloring tendencies compared to the product obtained when the unreacted $P_2S_5$ is removed after the first reaction stage. The exact chemistry involved is not completely understood, but it is believed that the unreacted $P_2S_5$ reacts with the aqueous ammonia used during neutralization forming products which react with the hydroxybenzyl chloride, giving a complex mixture of reaction products best defined by the manner in which they are prepared.

The reaction of $P_2S_5$ wtih the alcohol is usually complete in about 30 minutes to 8 hours. A preferred reaction time is from about 1–4 hours.

An essential feature of the present process is the use of aqueous ammonia to neutralize the reaction mixture. If other neutralizing agents such as sodium bicarbonate, sodium carbonate, sodium hydroxide, and the like, are used the final product is cloudy and extremely difficult to clarify by filtration due to the presence of a slime-like material. Furthermore, unless the neutralization is carried out in the manner described herein, the final product will tend to discolor the substrate to which it is added by turning it yellow. Although the discoloration does not lessen the effectiveness of the additive in preventing oxidative degradation, it is quite important because in some applications it is necessary that a non-discoloring antioxidant be used. Hence, the present process provides a superor product compared to similar products heretofore available.

The aqueous ammonia can be added following the alkanol-$P_2S_5$ reaction or it can be added after the addition of the hydroxybenzyl chloride. Both methods give a product that is readily clarified by filtration and is not plagued by the slime problem. Whichever method of neutralization is followed, the amount of aqueous ammonia should be such that the final reaction mixture (after the reaction with the hydroxy-benzyl chloride is complete) is substantially neutral. By "neutral" is meant that it has a pH of from about 5–8, preferably from about 6.5–7.5.

The preferred method of conducting the neutralization is to add sufficient aqueous ammonia to the reaction mixture following the alkanol-$P_2S_5$ reaction to subtsantially neutralize the reaction mixture. Preferably, the neutralization at this stage is such that the pH is raised to about 5.5–7.0. Following this the hydroxybenzyl chloride reactant is added and then additional aqueous ammonia is added at a controlled rate during the course of the reaction of the hydroxybenzyl chloride such that the pH during this reaction remains below about 6 preferably in the range of about 5–6. It has been found that if the aqueous ammonia is added too rapidly, such that the reaction mixture becomes alkaline, the course of the reaction is altered in some mnaner such that the resultant reaction product, although an effective antioxidant, will cause the substrate to which it is added to become yellow. Thus, a highly preferred embodiment of the process is the controlled addition of aqueous ammonia during the reaction of the hydroxybenzyl chloride with the reaction product of the alkanol and $P_2S_5$ at such a rate that the pH remains below about 6, preferably in the range of 5–6. After the reaction with the hydroxybenzyl chloride is complete the pH of the reaction mixture will stabilize (during the reaction the pH tends to decrease due to the formation of free acid). The pH can then be raised to about 7–8 without affecting the coloring properties of the product while at the same time assuring a neutral product.

Another method for conducting the neutralization is to add the hydroxybenzyl chloride to the reaction product of the alkanol and $P_2S_5$ without neutralizing and then, while stirring at a reaction temperature of about 50–150° C., to add aqueous ammonia at a controlled rate such that the pH of the reaction mixture remains below about 6, preferably in the range of about 5–6. After the reaction of the hydroxybenzyl chloride is complete, as evidenced by the stabilization of the pH, additional aqueous ammonia can be added to raise the pH to about 7–8 to assure a neutral product. This method is considered the equivalent of the previous embodiment in which the aqueous ammonia neutralization is conducted in two stages (viz., (1) after the alkanol-$P_2S_5$ reaction, and (2) during the hydroxybenzyl chloride reaction).

The hydroxybenzyl chloride used in the process is a benzyl chloride having a hydroxy group substituted in the benzene ring. Other substituents that do not interfere with the reaction can also be substituted on the benzene ring, such as chlorine, bromine, iodine, fluorine, nitro, alkoxy, hydroxyl, alkyl, aralkyl, and the like. Representative examples are:

2-hydroxybenzyl chloride,
4-hydroxybenzyl chloride,
3-hydroxybenzyl chloride,
3-hydroxy-5-methylbenzyl chloride,
3,4-dihydroxybenzyl chloride,
2-methyl-4-hydroxybenzyl chloride,
3-chloro-4-hydroxybenzyl chloride,
2-bromo-4-hydroxybenzyl chloride,
2-hydroxy-4-iodobenzyl chloride,
2-hydroxy-5-nitrobenzyl chloride,
3-methoxy-4-hydroxybenzyl chloride,
2-hydroxy-5-ethoxybenzyl chloride,
3-(α-methylbenzyl)-4-hydroxybenzyl chloride,
3,5-di-(α-methylbenzyl)-4-hydroxybenzyl chloride, and the like.

The preferred hydroxybenzyl chlorides are the alkyl-substituted hydroxybenzyl chlorides. Examples of these are:

3,5-dimethyl-4-hydroxybenzyl chloride
2-methyl-4-hydroxybenzyl chloride
2-methyl-5-tert-butyl-4-hydroxybenzyl chloride
3-sec-eicosyl-4-hydroxybenzyl chloride
2-hydroxy-5-dodecylbenzyl chloride 3-methyl-5-tert-butyl-4-hydroxybenzyl chloride
2-hydroxy-3-tert-butylbenzyl chloride
2-methyl-6-hydroxybenzyl chloride
2-hydroxy-5-dodecylbenzyl chloride
2-hydroxy-5-octadecylbenzyl chloride
2-hydroxy-5-eicosylbenzyl chloride
2-hydroxy-4-octylbenzyl chloride The 3,5-dialkyl-4-hydroxybenzyl chlorides are more preferred. These compounds have the formula:

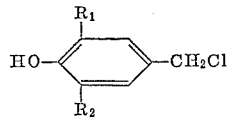

in which $R_1$ and $R_2$ are alkyl groups. Representative examples are:

3,5-dimethyl-4-hydroxybenzyl chloride,
3,5-diethyl-4-hydroxybenzyl chloride,
3-methyl-5-isopropyl-4-hydroxybenzyl chloride,
3,5-diisopropyl-4-hydroxybenzyl chloride,
3-methyl-5-tert-butyl-4-hydroxybenzyl chloride,
3,5-di-sec-butyl-4-hydroxybenzyl chloride,
3,5-di-tert-butyl-4-hydroxybenzyl chloride,
3,5-di-sec-hexyl-4-hydroxybenzyl chloride,
3-methyl-5-tert-amyl-4-hydroxybenzyl chloride,
3,5-di-tert-octyl-4-hydroxybenzyl chloride,
3,5-dicyclohexyl-4-hydroxybenzyl chloride,
3-methyl-5-cyclohexyl-4-hydroxybenzyl chloride,
3,5-di-sec-dodecyl-4-hydroxybenzyl chloride,
3-methyl-5-sec-dodecyl-4-hydroxybenzyl chloride,
3,5-di-tert-octadecyl-4-hydroxybenzyl chloride,
3-methyl-5-sec-eicosyl-4-hydroxybenzyl chloride,
3,5-di-sec-eicosyl-4-hydroxybenzyl chloride,
and the like.

Preferably, the alkyl radicals contain from 1 to about 20 carbon atoms. In a still more preferred embodiment at least one of the alkyl groups is an alpha-branched alkyl (i.e., a secondary or tertiary alkyl). Better antioxidant results are generally obtained when at least one of the alkyls is a tert-alkyl. Superior results are obtained when both alkyls are tert-alkyl. The most preferred hydroxybenzyl chloride is 3,5-di-tert-butyl-4-hydroxybenzyl chloride.

Although the process is described and illustrated herein using hydroxybenzyl chlorides, it should be understood that other hydroxybenzyl halides such as the hydroxybenzyl bromides can be used with equally good results. The chlorides are used because they are more readily available at a lower cost.

The reaction of the hydroxybenzyl chloride with the alkanol-$P_2S_5$ reaction mixture is carried out by adding from 1 to about 3 moles of the hydroxybenzyl chloride (per mole of $P_2S_5$) and stirring at reaction temperature. The reaction temperature should be high enough to cause the reaction to proceed at a reasonable rate, but not so high as to lead to decomposition. Good results are obtained in the range of about 50–150° C. Especially good results are achieved at about 60–100° C.

As discussed previously, the alkanol-$P_2S_5$ reaction mixture can be neutralized with aqueous ammonia prior to adding the hydroxybenzyl chloride, or the hydroxybenzyl chloride can be added without neutralization and then aqueous ammonia added during the course of the hydroxybenzyl chloride reaction. In either case, it is preferred that the amount of aqueous ammonia added should be limited so that the pH remains below about 6 until the reaction is essentially completed, at which time it may be increased to assure a fully neutralized product. If the pH is allowed to rise above about 6, during the hydroxybenzyl chloride reaction the product, although still being an effective antioxidant and having the advantage over the prior art of easy filtrability, will, however, tend to cause the organic substrate to which it is added to discolor. If color is not a problem, then the pH of the neutralized mixture need not be maintained below about 6 during the reaction, in which case excess aqueous ammonia can be added. This is one embodiment of the invention in which the advantage over the prior art is the absence of slime which hinders filtration. However, if a non-discoloring additive is required, it is essential that the aqueous ammonia be added at a controlled rate such that the pH is maintained below about 6 until the reaction is substantially complete.

The preferred manner of conducting the process is to first neutralize the alkanol-$P_2S_5$ reaction mixture by adding aqueous ammonia until the pH rises above about 5.5. If a non-discoloring product is required, an excess amount should not be added at this time. A preferred pH at this stage is about 5.5–7. Following this, the hydroxybenzyl chloride is added and the reaction mixture stirred at about 50–150° C. During this reaction the pH will tend to decrease. As this occurs, more aqueous ammonia is added at a controlled rate such that the pH does not rise above about 6. In other words, the reaction mixture is maintained slightly on the acid side. A good method of monitoring the aqueous ammonia addition is to add aqueous ammonia at a rate which maintains the pH between about 5 and 6. Allowing the pH to drop below 5 is not harmful, although if it drops too low the reaction will become sluggish. Also, pH excursions above about 6 for short periods of time are not harmful, especially if they occur late in the reaction period. What is required is that the reaction with hydroxybenzylchloride be conducted such that the pH is predominantly maintained below about 6 until the reaction is substantially complete.

The following examples serve to illustrate the manner in which the process is carried out. All parts are by weight unless indicated otherwise.

EXAMPLE 1

In a glass-lined reaction vessel was placed 94 parts of a mixture of aliphatic monohydric alcohols containing from about 18–50 carbon atoms (predominantly in the $C_{20}$–$C_{20}$ range) and containing 35 weight percent hydrocarbons (predominantly $C_{20}$–$C_{50}$ paraffins). Analysis showed the alcohol mixture to have a bromine number of 10.5 and to contain 2.76 weight percent hydroxyl. Average molecular weight based on hydroxyl analysis was 618. To this mixture was added 94 parts of toluene and 12.44 parts of $P_2S_5$. While stirring, the mixture was heated to 90° C. (Note: Vent evolved $H_2S$ to caustic scrubber.) The mixture was stirred at 90° C. for an hour and then cooled to 70° C. The mixture was neutralized to pH 5.5 by adding 4.05 parts of 24.5 weight percent aqueous ammonia. The temperature rose to 76° C. during neutralization. Then, 35.27 parts of 3,5-di-tert-butyl-4-hydroxybenzyl chloride were added at 70° C., causing the pH to drop sharply. While stirring, additional aqueous ammonia was added at a contolled rate such that the pH remained below 6. This reaction stage required 4 hours, during which time a total of 3.56 parts of 24.5 weight percent aqueous ammonia were added. The water phase was then removed and the product was filtered. Toluene solvent was distilled out. A product having the texture of soft wax at room temperature and a liquid when warmed to about 50° C. was obtained. This reaction product was an excellent antioxidant which did not cause discoloration of organic substrates.

EXAMPLE 2

In a reaction vessel was placed 100 parts of toluene, 106.3 parts (0.172 mole) of the alcohol mixture used in Example 1, and 12.6 parts (0.057 mole) of $P_2S_5$. This mixture was stirred at 90° C. fo an hour and then neutralized to pH 6.3 using 6.03 parts of 24.5 weight percent aqueous ammonia. The mixture was cooled to room temperature and 22.15 parts (0.087 mole) of 3,5-di-tert-butyl-4-hydroxybenzyl chloride were added and the mixture heated to 90° C. and stirred at that temperature for 2 hours while adding 24.5 weight percent aqueous ammonia at a controlled rate to maintain the pH in the range of 5–6. This required 8.95 parts of aqueous ammonia.

At the end of the reaction the pH was allowed to increase to about 7.5. The water phase was removed and the toluene distilled out. The product was filtered hot, giving an excellent antioxidant reaction product of this invention.

EXAMPLE 3

In a reaction vessel was placed 100 parts of toluene, 106.3 parts (0.172 mole) of the alcohol mixture used in Example 1, and 14 parts (0.063 mole) of $P_2S_5$. The mixture was stirred at 90° C. for an hour and then neutralized with 4.4 parts (0.063 mole) of 24.5 weight percent aqueous ammonia. Following this, 22.6 parts (0.089 mole) of 3,5-di-tert-butyl-4-hydroxybenzyl chloride were added and the mixture stirred 2 hours at 70° C. while maintaining the pH between about 5–6 by the controlled addition of 6.8 parts (0.098 mole) of 24.5 weight percent aqueous ammonia. The water phase was then removed and the mixture filtered. Toluene was distilled out, leaving a useful antioxidant composition.

EXAMPLE 4

In a reaction vessel of Example 1 was placed 106 parts (0.172 mole) of the alcohol mixture used in Example 1. 100 parts of toluene, and 14 parts (0.063 mole) of $P_2S_5$. This mixture was stirred an hour at 90° C. It was then neutralized to pH 6.1 using 4.86 parts (0.07 mole) of 24.5 weight percent aqueous ammonia. It was then cooled to 70° C. and 22.6 parts (0.089 mole) of 3,5-di-tert-butyl-4-hydroxybenzyl chloride were added over a 30 minute period. It was then stirred 2 hous at 70° C. During the addition and stirring period the pH was maintained at about 5.5–6 by the controlled addition of 6.3 parts (0.09 mole) of 24.5 weight percent aqueous ammonia. The water was removed and the product filtered. The toluene was distilled out, leaving a useful antioxidant composition of this invention.

EXAMPLE 5

In a reaction vessel place 558 parts (3 moles) of n-dodecanol, 500 parts of xylene, and 222 parts (1 mole) of $P_2S_5$. Heat the mixture to 100° C. and stirr at that temperature for an hour. Cool to 70° C. and add sufficient concentrated aqueous ammonia to raise the pH to 6. Add 355 parts (1.4 mole) of 2-hydroxy-3,5-di-tert-butylbenzyl chloride and stir at 70–80° C. for 2 hours while maintaining the pH at 5–6 by adding concentrated aqueous ammonia at a controlled rate. At the end add sufficient aqueous ammonia to increase the pH to 7.5. Remove the aqueous phase and wash the product with water. Remove the water and filter. Distill out xylene, leaving a useful antioxidant composition.

The above example can be repeated with good results using other alcohols such as methanol, isopropanol, n-butanol, n-decanol, isodecanol, octadecanol, eicosanol, triacontanol, pentacontanol, and the like. Likewise, other hydroxybenzyl chlorides can be used, such as 3-methyl-5-tert-butyl-4-hydroxybenzyl chloride, 3,5 - di($\alpha$-methylbenzyl)-4-hydroxybenzyl chloride, 3,5-diisopropyl-4-hydroxybenzyl chloride, 2 - methyl-5-tert-butyl-4-hydroxybenzyl chloride, 2,5-di-tert-butyl-4-hydroxybenzyl chloride, 3-tert-butyl-6-methyl-2-hydroxybenzyl chloride, and the like, resulting in the corresponding reaction product.

EXAMPLE 6

This example illustrates the embodiment of the invention in which the aqueous ammonia neutralization is done in a single stage after adding the hydroxybenzyl chloride.

In a reaction vessel place 558 parts (3 moles) of n-dodecanol, 222 parts (1 mole) of $P_2S_5$, and 500 parts of toluene. Under a nitrogen atmosphere, heat to 80° C. and stir at 80–90° C. for 2 hours. Cool to 70° C. and add 339 parts (1.6 moles) of 3-tert-butyl - 5 - methyl-2-hydroxybenzyl chloride. While stirring at 70° C. add concentrated aqueous ammonia until the pH rises to the 5–6 range. Continue stirring at 70° C. and adding concentrated aqueous ammonia at a rate to maintain the pH in the 5–6 range. Once the pH stabilizes without adding aqueous ammonia stir the mixture for 15 minutes at 70–80° C. while raising the pH to 7.5 by adding aqueous ammonia. Cool to 50° C. and separate the aqueous phase. Wash the organic phase twice with water at 50° C. Filter and distill out the toluene solvent to obtain an effective antioxidant reaction product of this invention.

The reaction products of this invention are useful in providing antioxidant protection in a broad range of organic materials of the type normally subject to oxidative deterioration in the presence of oxygen during use over an extended period. In other words, the organic compositions protected by the present antioxidants are the type in which the art recognizes the need for antioxidant protection and to which an antioxidant of some type is customarily added to obtain an extended service life. The oxidative degradation protected against is the slow gradual deterioration of the organic composition rather than, for example, combustion. In other words, the present additives are not flame-retarding additives nor flame-suppressing additives and the degradation protected against is not combustion but, rather, the gradual deterioration of the organic composition due to the effects of oxygen over an extended period of time.

Examples of organic materials in which the additives are useful include synthetic organic polymers including polyolefins such as polyethylene, polypropylene, polybutadiene, and the like. Also, poly-halohydrocarbons such as polyvinyl chloride, polychloroprene, polyvinylidene chloride, polyfluoro olefins, and the like, are afforded stabilization. It is especially useful in synthetic rubber such as polybutadiene (both cis and trans), polybutene, polyisoprene, and the like, as well as the copolymers of two or more olefinically unsaturated monomers such as styrene-butadiene rubber (SBR rubber), ethylene-propylene-diene terpolymers such as the terpolymer of ethylene, propylene and cyclopentadiene or cyclooctadiene; likewise, acrylonitrile-butadiene and acrylonitrile-butadiene-styrene resins are effectively stabilized. Ethylene-vinyl acetate copolymers are protected, as are butene methylacrylate copolymers. Nitrogen-containing polymers such as polyurethanes, nitrile rubber, and lauryl acrylate-vinylpropylidone copolymers are effectively stabilized. Adhesive compositions such as solutions of polychloroprene ("neoprene") in toluene are protected.

Fats and oils of animal and vegetable origin are protected against gradual deterioration. Examples of these are lard, beef tallow, coconut oil, safflower oil, castor oil, babassu oil, cottonseed oil, corn oil, rapeseed oil, and the like.

Petroleum oils and waxes such as solvent-refined, mid-continent lubricating oil, microcrystalline wax, and gulfcoast lubricating oils are effectively stabilized. Animal feeds such as ground corn, cracked wheat, oats, wheat germ, alfalfa, and the like, are protected by mixing a small but effective amount of the present additive with these products. Vitamin extracts, especially the fat-soluble vitamins such as Vitamins A, B, D, E and K are effectively stabilized against degradation. The additives are useful in foamed plastics such as expanded polystyrene, polyurethane foams, and the various foamed rubbers, alkyd resins such as short oil terephthalic acid-glycerol-linseed oil resins, and typical long oil resins of trimellitic acid-glycol-tongue oil resins including epoxide-modified alkyl resins. Epoxy resins themselves such as isopropylidene bisphenol-epichlorohydrin epoxy resins are stabilized against degradation.

Hydrocarbons such as gasoline, kerosene, diesel fuel, fuel oil, furnace oil, and jet fuel are effectively protected. Likewise, synthetic hydrocarbon lubricants, for example, $\alpha$-decene trimer, polybutene lubricants, di- and tri- $C_{12-30}$ alkylated benzene and naphthalene synthetic lubricants are likewise protected.

Organometallics such as tetraethyllead, tetramethyllead, tetravinyllead, ferrocene, methyl ferrocene, cyclopentadienyl manganese tricarbonyl, methyl cyclopentadienyl manganese tricarbonyl, cyclopentadienyl nickel nitrosyl, and the like, are effectively protected against oxidative degradation. Silicone oils and greases are also protected.

Synthetic ester lubricants such as those used in turbines and turbojet engines are given a high degree of stabilization. Typical synthetic ester lubricants include di-2-ethylhexyl sebacate, trimethylolpropane tripelargonate, $C_{5-9}$ aliphatic monocarboxylic esters of pentaerythritol, complex esters formed by condensing under esterifying conditions mixtures of polyols, polycarboxylic acids, and aliphatic monocarboxylic acids and/or monohydric alkanols. An example of these complex esters is the condensation product formed from adipic acid, ethyleneglycol and a mixture of $C_{5-9}$ aliphatic monocarboxylic acids. Plasticizers such as dioctyl phthalate are effectively protected. Heavy petroleum fractions such as tar and asphalt can also be protected should the need arise.

Polyamides such as adipic acid-1,6-diaminohexane condensates and poly-6-aminohexanoic acid (nylon) are effectively stabilized. Polyalkylene oxides such as copolymers of phenol with ethylene oxide or propylene oxide are stabilized. Polyphenyl ethers such as poly-2,6-dimethylphenyl ether formed by polymerization of 2,6-dimethylphenol using a copper-pyridine catalyst are stabilized. Polycarbonate plastics and other polyformaldehydes are also protected.

Linear polyesters such as phthalic anhydride-glycol condensates are given a high degree of protection. Other polyesters such as trimellitic acid-glycerol condensates are also protected. Polyacrylates such as polymethylacrylate and polymethylmethacrylate are effectively stabilized. Polyacrylonitriles and copolymers of acrylonitriles with other olefinically unsaturated monomers such as methylmethacrylates are also effectively stabilized.

The additives can be used to protect any of the many organic substrates to which an antioxidant is normally added. It can be used, where economics permit, to protect such substrates as road tar, paper, fluorocarbons such as Teflon, polyvinyl acetate, polyvinylidene chloride, coumarone-indene resins, polyvinyl ethers, polyvinylidene bromide, polyvinyl bromide, acrylonitrile, vinyl bromide copolymer, vinyl butyral resins, silicones such as dimethylsilicone lubricants, phosphate lubricants such as tricresylphosphate, and the like.

The additives are incorporated into the organic substrate in a small but effective amount so as to provide the required antioxidant protection. A useful range is from about 0.01 to about 5 weight percent, and a preferred range is from about 0.1 to 3 weight percent.

Methods of incorporating the additive into the substrate are well known. For example, if the substrate is liquid the additive can be merely mixed into the substrate. Frequently, the organic substrate is in solution and the additive is added to the solution and the solvent removed. Soild organic substrates can be merely sprayed with a solution of the additive in a volatile solvent. For example, stabilized grain products result from spraying the grain with a toluene solution of the additive. In the case of rubbery polymers the additive can be added following the polymerization stage by mixing it with the final emulsion or solution polymerization mixture and then coagulating or removing solvent to recover the stabilized polymer. It can also be added at the compounding stage by merely mixing the additive with the rubbery polymer in commercial mixing equipment such as a Banbury blender. In this manner, rubbery polymers such as styrene-butadiene rubber, cis-poly-butadiene or isoprene polymers are blended with the antioxidant together with the other ingredients normally added such as carbon black oil, sulfur, zinc oxide, stearic acid, vulcanization accelerators, and the like. Following mastication, the resultant mixture is fabricated and molded into a finished form and vulcanized. The following will serve to illustrate the manner in which the additives are blended with various organic substrates.

EXAMPLE 7

To a synthetic rubber master batch comprising 100 parts to SBR rubber having an average molecular weight of 60,000, 50 parts of mixed zinc propionate stearate, 50 parts carbon black, 5 parts road tar, 2 parts sulfur and 1.5 parts of mercapto benzothiazole is added 1.5 parts of the reaction product of Example 1. After mastication, the resultant master batch is cured for 60 minutes using 45 p.s.i. steam pressure, resulting in a stabilized SBR vulcanizate.

EXAMPLE 8

A synthetic SBR polymer is prepared by polymerizing 60 percent styrene and 40 percent butadiene in an aqueous emulsion employing a sodium oleate emulsifier and a peroxide catalyst. Following this, a sufficient amount of the reaction product of Example 2 is added to provide 0.3 weight percent, based upon the SBR polymer. The emulsion is then coagulated using an acidified salt solution and the coagulated polymer compressed into bales for storage. The polymer is quite stable during storage and can later be compounded to prepare SBR vulcanizates.

EXAMPLE 9

One part of the reaction product of Example 3 is blended with 100 parts of raw butyl rubber prepared by the copolymerization of 90 percent isobutylene and 10 percent isoprene.

EXAMPLE 10

A cis-poly-butadiene polymer is prepared having 90 percent cis configuration by polymerizing butadiene in a toluene solvent employing a diethyl aluminum chloride-cobalt iodide catalyst. Following the polymerization, a small amount sufficient to provide 0.2 weight percent of the reaction product of Example 4 is added to the toluene solution, following which the solution is injected into boiling water together with steam causing the solvent to distill out and the cis-poly-butadiene to coagulate, forming a rubber crumb. The crumb is dried and compressed into bales, resulting in a stabilized cis-poly-butadiene.

EXAMPLE 11

A butadiene-acrylonitrile copolymer is prepared from 1,3-butadiene and 32 percent of acrylonitrile. One percent, based on the weight of polymer, of the reaction product of Example 1 is added as an emulsion in a sodium oleate solution. The latex is coagulated and the coagulum is washed and dried, resulting in a stabilized butadiene-acrylonitrile copolymer.

EXAMPLE 12

To 1,000 parts of a solid polypropylene powder is added 5 parts of the reaction product of Example 2 and 10 parts of dilaurylthiodipropionate. The mixture is heated to its meling point and rapidly stirred and extruded to form a useful polypropylene filament.

EXAMPLE 13

To 1,000 parts of polyethylene is added 3 parts of the reaction product of Example 3 and 5 parts of dilaurylthiodipropionate. The mixture is heated to its melting point and stirred and then passed through an extruder having a central mandrel to form tubular polyethylene which is inflated to form a useful polyethylene film.

EXAMPLE 14

To 100,000 parts of a midcontinent, solvent-refined, mineral oil having a viscosity at 100° F. of 373.8 SUS and at 210° F. of 58.4 SUS is added 500 parts of the reaction product of Example 4. Following this is added 100 parts of a zinc dialkyldithiophosphate, 50 parts of an overbased calcium alkaryl sulfonate, 1,000 parts of a poly-dodecylmethacrylate VI improver and 2,000 parts of a 70 percent active oil solution of an alkenyl succinimide of tetraethylenepentamine in which the alkenyl group has a molecular weight of 950. The resultant mixture is blended while warm, following which it is filtered and packaged, giving a stable lubricating oil useful in automotive engines.

EXAMPLE 15

To 10,000 parts of a dimethyl silicone lubricating oil is added 50 parts of the reaction product of Example 1. The mixture is stirred at 50° C. until thoroughly blended, resulting in a stable silicone lubricating oil.

EXAMPLE 16

To 10,000 parts of corn oil is added 15 parts of the reaction product of Example 2. The mixture is stirred, giving a corn oil highly resistant to normal oxidative degradation.

EXAMPLE 17

To 10,000 parts of trimethylolpropane tripelargonate is added 200 parts of tricresylphosphate, 10 parts of dimethyl silicone, 10 parts of benzothiazole, 50 parts of phenyl-β-naphthol amine, and 50 parts of the reaction product of Example 3, resulting in a stabilized synthetic ester lubricant.

EXAMPLE 18

Wax paper is made by impregnating paper with paraffin wax containing 0.05 weight percent of a reaction mixture of Example 4. The wax paper is used to make containers for potato chips which result in chips having extended shelf life.

EXAMPLE 19

To 10,000 parts of gasoline having an 87 R.O.N. is added 20 parts of a reaction product of Example 1 and sufficient commercial tetraethyllead antiknock fluid to provide 2.5 grams of lead per gallon, resulting in a stabilized gasoline having a 96 R.O.N.

EXAMPLE 20

To 10,000 parts of 41 cetane diesel fuel is added 50 parts of hexyl nitrate and 25 parts of a reaction mixture of Example 2, providing a stable diesel fuel.

EXAMPLE 21

To 10,000 parts of melted lard is added 10 parts of a reaction mixture of Example 3 and the mixture is stirred until thoroughly blended, resulting in a lard highly resistant to normal oxidative degradation.

From the foregoing, it is apparent how to prepare stable organic compositions using the additives of this invention.

Tests were carried out to demonstrate the effectiveness of the reaction products in stabilizing a typical organic material normally susceptible to gradual deterioration during normal use due to the effects of oxygen. The material used in the tests was styrene-butadiene rubber (SBR). Samples of SBR containing the reaction product of Examples 1 and 3 were prepared by adding an aqueous emulsion of the reaction products to an aqueous emulsion of the SBR copolymer (latex). The latex was coagulated by adding it to a sulfuric acid-sodium chloride aqueous solution and drying the coagulated crumb. The dried crumb was aged in an air circulating oven at 76° C. and the Mooney viscosity and percent gel (toluene insolubles) determined periodically. Ideally the Mooney viscosity should remain constant and no gel should form. The results obtained are shown in the following table.

| Product | Conc. (phr.) | Mooney number | | | | Percent gel | | |
|---|---|---|---|---|---|---|---|---|
| | | 0 day | 5 days | 10 days | 14 days | 5 days | 10 days | 14 days |
| Example: | | | | | | | | |
| 1 | 0.75 | 50 | 51 | 50 | | 0 | 0 | 1.3 |
| 3 | 1.0 | 52 | 52 | 52 | 51 | | | |

As the above results show, the Mooney viscosity was practically unchanged during the test, and even at 0.75 phr. the gel formation was practically nil. This demonstrates a very high degree of the effectiveness of the reaction products of this invention.

What is claimed is:

1. Organic material normally susceptible to gradual deterioration in normal use due to the effects of oxygen containing an antioxidant amount of an antioxidant composition made by the process of:
   (A) reacting about 2–3.5 moles of a $C_{1-50}$ monohydric alkanol or mixtures thereof with one mole of $P_2S_5$ at a temperature of from about 75–125° C. to form a dithiophosphate reaction mixture,
   (B) neutralizing said dithiophosphate reaction mixture with aqueous ammonia to a pH of about 5.5–7, said neutralization being conducted without removing unreacted $P_2S_5$, and
   (C) adding from about 1 to 3 moles of a 3,5-dialkyl-4-hydroxybenzyl chloride to the neutralized reaction mixture and reacting at a temperature of about 50–150° C. while adding aqueous ammonia at a controlled rate such that the pH is maintained below about 6.

2. An organic material of claim 1 wherein said monohydric alkanol is a $C_{20-50}$ monohydric alkanol or mixtures thereof.

3. An organic material of claim 1 wherein said 3,5-dialkyl-4-hydroxybenzyl chloride is 3,5-di-tert-butyl-4-hydroxybenzyl chloride.

4. A composition of claim 1 wherein said organic material is a synthetic rubber.

5. A composition of claim 4 wherein said synthetic rubber is a styrene-butadiene rubber.

6. An organic material of claim 5 wherein said monohydric alkanol is a $C_{20-50}$ monohydric alkanol or mixtures thereof and said 3,5-dialkyl-4-hydroxybenzyl chloride is 3,5-di-tert-butyl-4-hydroxybenzyl chloride.

7. A composition of claim 6 wherein said antioxidant composition is made by the process comprising:
   (A) reacting from about 2–3.5 moles of said mixture of monohydric aliphatic alcohols with a mole of $P_2S_5$ at a temperature of from about 75–125° C. to form a dithiophosphate reaction mixture;
   (B) neutralizing said dithiophosphate reaction mixture with aqueous ammonia to a pH of from about 5.5 to 7;
   (C) adding from about 1.2–1.6 moles of 3,5-di-tert-butyl-4-hydroxybenzyl chloride and reacting at a temperature of about 60–100° C. while adding aqueous ammonia at a controlled rate such that the pH is maintained in the range of about 5–6 during the reaction.

References Cited
UNITED STATES PATENTS

| | | | |
|---|---|---|---|
| 2,530,339 | 11/1950 | Mikeska et al. | 252—32.7 |
| 2,552,570 | 5/1951 | McNab et al. | 260—45.7 |
| 3,061,586 | 10/1962 | Thompson | 260—45.95 |

DONALD E. CZAJA, Primary Examiner

V. P. HOKE, Assistant Examiner

U.S. Cl. X.R.

99—163; 252—49.8, 404; 260—398.5, 666.5, 953, 981